Patented Feb. 2, 1926.

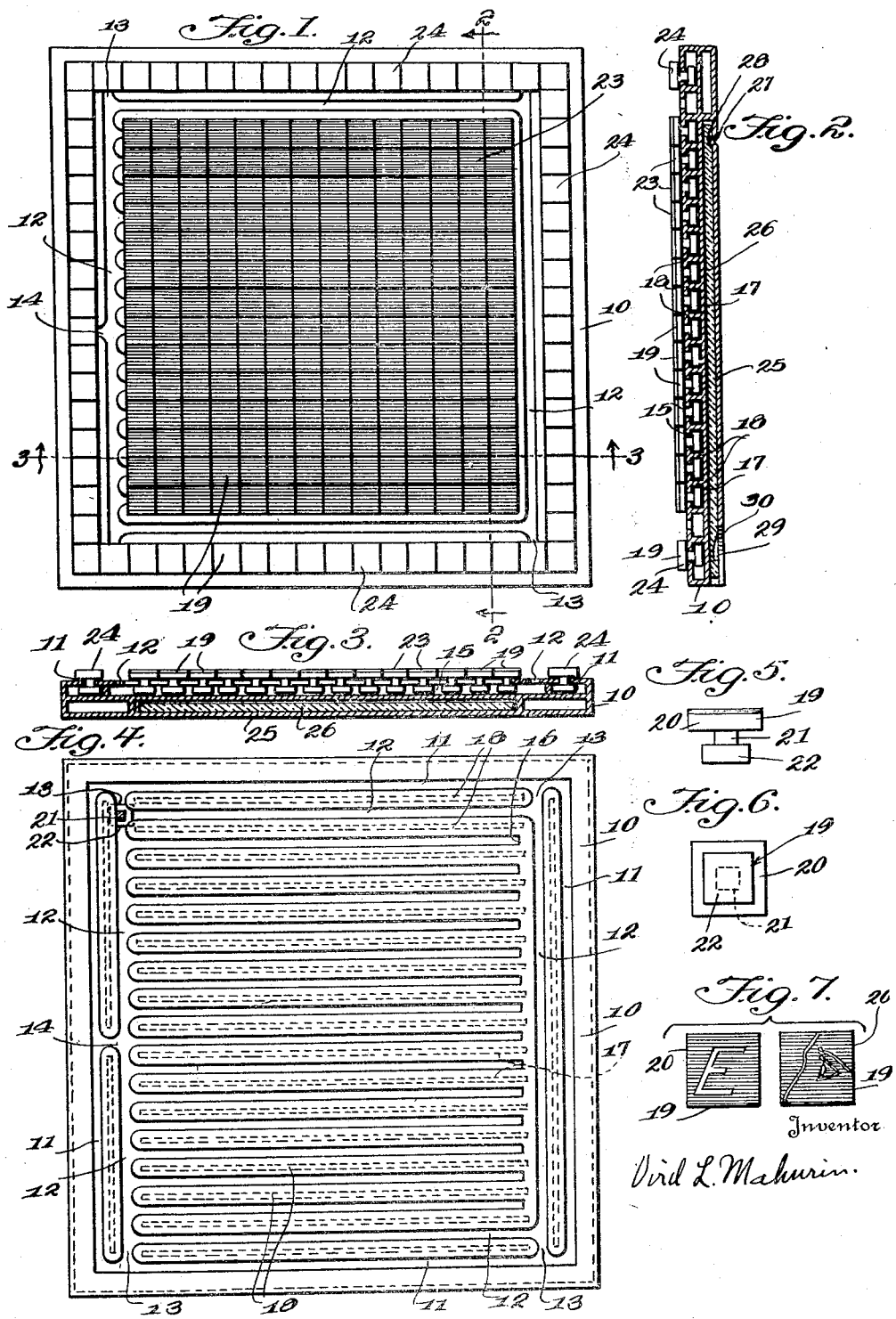

1,571,856

UNITED STATES PATENT OFFICE.

VIRD L. MAHURIN, OF PRINCETON, MISSOURI.

PUZZLE BOARD.

Application filed April 1, 1925. Serial No. 19,869.

*To all whom it may concern:*

Be it known that I, VIRD L. MAHURIN, a citizen of the United States, residing at Princeton, in the county of Mercer and State of Missouri, have invented certain new and useful Improvements in a Puzzle Board, of which the following is a specification.

The present invention relates to a puzzle board, and aims to provide a novel and improved device of this character having a plurality of movable members of two different colors thereon, which may be moved to various positions for forming cross word puzzles, members of one color having surfaces on the upper sides thereof for permitting writing thereon, while members of the other color are used for spaces to separate the various words, said writing matter being applied in such a manner that the same may be removed or erased after each puzzle is formed and applied again in solving the puzzle.

Another object of the invention is the provision of a recess in the bottom of the board for receiving a small blackboard or slate to be used in writing the various definitions for the words to be placed on the movable members.

A further object of the invention is to provide a device as above indicated, which may be used as a checkerboard, one set of the movable members being used for the spots the checkers are moved upon, while the other set is used for the spaces between the spots.

A still further object of the invention is to provide a device which may be used as a picture puzzle, the movable members having the writing surface thereon being moved to engagement with each other to form an even, flat writing surface for drawing a picture thereon, and then moved out of their respective positions that form the picture, the puzzle being to move the members back to the original position and again form the picture.

A further object of the invention is the provision of a slotted board having a plurality of members movable in the slots in the board, said members being held against turning movement on the board, each of said members being adapted to be arranged to engage the members adjacent thereto to provide an even and relatively large, flat surface.

It is also an object of the invention to provide a puzzle board of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a plan view of my improved device showing the movable members arranged thereon, Figure 2 is a section taken on line 2—2 of Figure 1, Figure 3 is a section on line 3—3 of Figurge 1, taken across the board opposite to the line on which Figure 2 is taken.

Figure 4 is a plan view similar to Figure 1, showing the movable members removed, Figure 5 is a side elevation of one of the movable members, Figure 6 is a bottom plan of the same, and Figure 7 is a plan view of a pair of the movable members, showing the manner in which writing matter is placed thereon.

In carrying out the invention, the numeral 10 indicates a board, which is substantially square in top plan, said board having a continuous groove 11 adjacent the edges thereof and parallel with said side edges. Inwardly of the groove 11 and parallel therewith is provided another continuous groove 12, which is provided with portions 13 at each corner of the board communicating with the groove 11 and a portion 14 communicating with said groove 11 intermediate one of the side edges of the board. Extending inwardly from the side wall of the groove 12 which has the communication 14 therewith is provided a series of grooves 15 which terminate at a point adjacent the groove 12 at the opposite side edge of the board, as indicated by the numeral 16. All of the grooves are enlarged at their inner or lower portions, as at 17, which form partitions 18 between said grooves that are T-shape in cross section.

Received in said grooves is a series of movable members 19 having enlarged heads 20 on their upper ends, reduced necks 21 intermediate their ends, and small heads 22 on their lower ends, said small heads 22 and large heads 20 being of square formation in plan. The small heads 22 of the movable members are received in the enlarged portion 17 of the slots, the opposite side edges engaging the edges of said slots so as to prevent turning movement of the movable members, while the enlarged heads 20 are of sufficient size to permit the side edges thereof to snugly engage each other when arranged in slots adjacent each other.

There are provided two sets of movable members, each set being different in color from the other set in order to clearly distinguish a member of one set from a member of the other, the set of darker color being designated by the numeral 23, while the set of lighter color is indicated by the numeral 24. The movable members 23 are provided with writing surfaces on their upper side so as to permit chalk to be used for writing thereon. As shown in Figure 1 the movable members 23 which have the writing surfaces thereon are all positioned in the grooves 15, while the movable members 24 are arranged in the outer continuous groove 11.

In the lower portion of the board 10 is provided a recess 25 for receiving a blackboard or slate 26 when not in use. The wall forming the lower side of the recess 25 has an inwardly struck indentation 27 for engaging in a small notch 28 provided in the rear side of the slate or blackboard, in order to yieldably hold the slate or blackboard in the recess. At the outer edge and on the rear surface of the blackboard or slate 26 is arranged a finger engaging notch 29 for sliding the slate or blackboard out of the recess, the wall forming the lower side of the recess being cut away, as at 30, in order that the finger engaging notch 29 may be engaged.

In operation, the two sets of movable members are moved to various positions on the board by sliding the movable members through the various slots provided in the board, in order to provide a cross word puzzle design, checkerboard design, or to a position as indicated in Figure 1 for providing a surface for drawing a picture puzzle. It will be noted that when the movable members are positioned so as to fill all of the grooves 15 the side edges of said movable members will engage the side edges of the movable members adjacent thereto in order to provide a smooth, unobstructed surface.

Having thus described my invention, what I claim as new is:

A cross word puzzle apparatus comprising a board having a bounding edge composed of angularly disposed lengths, the board being provided on one side with a continuous groove having angularly disposed lengths which are disposed parallel with the adjacent lengths of the bounding edge of the board, the board being provided on the same side with a second continuous groove located within the first mentioned groove and having angularly disposed lengths which are disposed parallel with the adjacent lengths of the first mentioned groove and parallel with the adjacent lengths of the bounding edge of the board, the board being provided on the same side with relatively short groove sections which join with the second mentioned groove at the angles of the corners thereof and with the first mentioned groove at points spaced from the angles of the corners thereof, the board being provided on the same side with a series of parallel grooves located within the second mentioned continuous groove, said parallel grooves being closed at one end and joined at their opposite ends with one of the lengths of the second mentioned continuous groove, and members mounted for movement along all of the grooves.

In testimony whereof, I have affixed my signature.

VIRD L. MAHURIN.